United States Patent Office 3,157,327
Patented Nov. 17, 1964

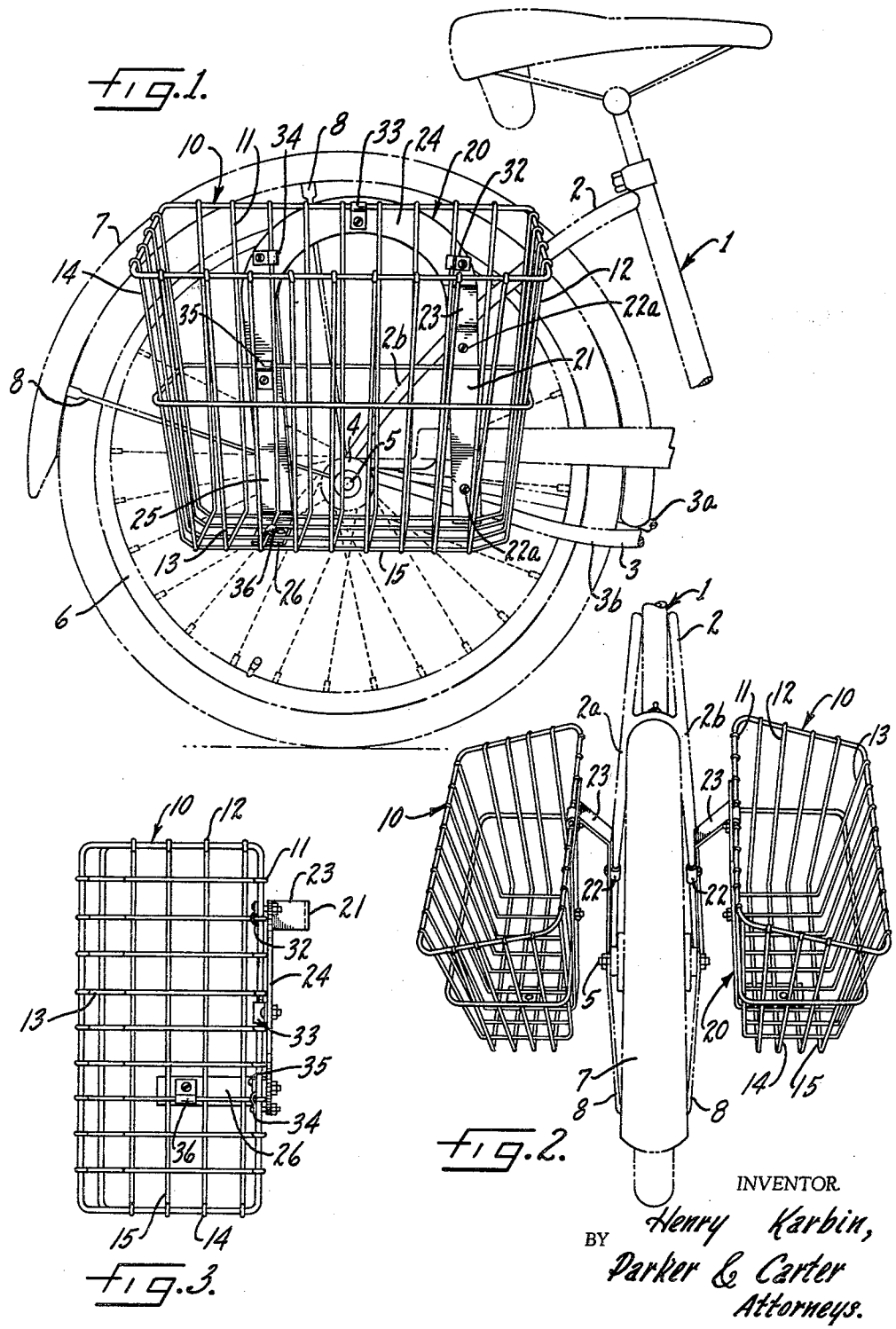

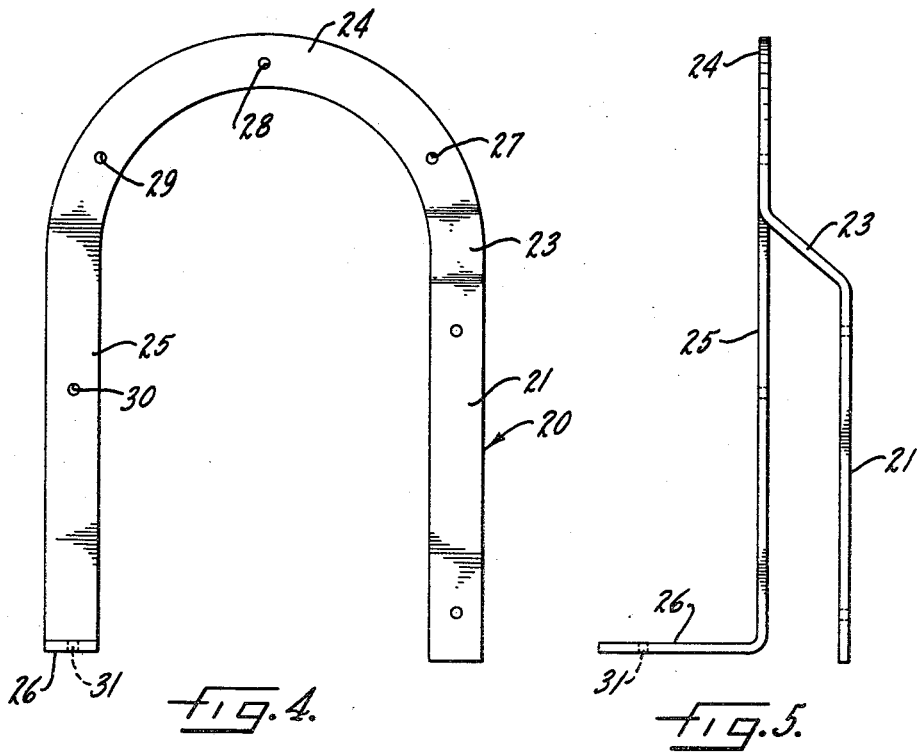

3,157,327
CARRIER ASSEMBLY
Henry Karbin, 2447 W. Lunt Ave., Chicago, Ill.
Filed Jan. 7, 1963, Ser. No. 249,638
7 Claims. (Cl. 224—30)

This invention relates to carrier assemblies and has particular relation to carrier assemblies for use on bicycles and the like.

One purpose of the invention is to provide a simplified mounting means for a saddle-type carrier for bicycles, motorcycles and the like.

Another purpose is to provide a saddle basket assembly for bicycles wherein a minimum number of parts are employed.

Another purpose is to provide a saddle basket assembly for bicycles and the like whereby saddle baskets may be rigidly and securely carried and spacedly positioned on opposite sides of a bicycle fender without contact with said fender.

Another purpose is to provide a saddle basket assembly for bicycles and the like formed and adapted to be supported solely by the rigid bicycle frame.

Another purpose is to provide individualized saddle basket assemblies which may be employed together or separately.

Another purpose is to provide a saddle basket assembly for bicycles and the like formed and adapted to permit the positioning of a basket at various points longitudinally of the bicycle.

Another purpose is to provide a saddle basket assembly for bicycles and the like effective to support saddle baskets in laterally spaced relation to the bicycle and accessories thereon.

Another purpose is to provide a saddle basket support member formed essentially in one piece.

Other purposes will appear from time to time in the course of the specification and claims.

The invention is illustrated more or less diagramatically in the accompanying drawings, wherein:

FIGURE 1 is a side elevation;
FIGURE 2 is an upper rear view;
FIGURE 3 is a top plan view of one assembly of the invention;
FIGURE 4 is a detail side elevation; and
FIGURE 5 is an end view of the structure shown in FIGURE 4.

Like parts are identified by like numerals throughout the specification and drawings.

Referring now to the drawings, and particularly to FIGURE 1, the numeral 1 generally designates the rear portion of a bicycle. Since the invention may be used on bicycles and similar vehicles of well known construction, only a portion of the bicycle 1 is illustrated herein. Conventionally the bicycle 1 has a rear frame portion comprising an upper fork 2 arranged in a rearwardly, downwardly inclined path and a bottom fork 3 which may be horizontal or slightly upwarldy inclined, depending upon the construction of the bicycle 1, it being understood that the forks 2, 3 meet at a rear point 4 through which the wheel-supporting axle 5 extends for rotatable support of a wheel 6, the wheel 6 turning within the branches 2a, 2b of fork 2 and the branches 3a, 3b of fork 3. A fender 7 overlies the upper portion of wheel 6, a forward portion of the fender 7 extending through and secured to the forks 2, 3, a rearward portion of the fender 7 being supported by its own relatively weaker frame elements, such as those shown for example at 8.

A wire basket 10 is formed of four wire side walls 11, 12, 13 and 14 and a bottom wire wall 15.

A unitary basket spacing and supporting member 20 is generally U-shaped in planar configuration. It will be understood that a member 20 is provided for each side of bicycle 1 and that the following description of one member 20 will, for convenience, suffice for a description of both. A first leg portion 21 is arranged for substantially vertical support against and on the branches 2b, 3b of fork 2, 3. Suitable clamps, such as that shown at 22, are provided for engagement with the inner surfaces of the branches 2b, 3b, the said clamps being drawn up against said inner surfaces by fasteners such as those indicated at 22a, the surface of leg 21 opposite said clamps being thus brought into engagement with the outer surfaces of branches 2b, 3b. The leg 21 has adjacent its inner end an angularly offset portion 23, the angle of which may be best seen, for example, in FIGURE 2, the portion 23 extending upwardly, outwardly when installed on bicycle 1, as shown in preferred form in FIGURE 2. It will be understood, however, that portion 23 could extend perpendicularly from bicycle 1 without departing from the nature and scope of the invention.

From the end of offset or outrigger portion 23 the member 20 continues in a generally curved central portion 24. The end of the curved portion 24 opposite that joining offset 23 continues in a second vertical leg 25 which substantially parallels leg 21 but in a plane offset therefrom by the space created by offset 23. The opposite or lowermost end of leg 25 integrally joins a perpendicularly, outwardly disposed end portion 26.

The portions 24, 25, 26 are laterally apertured at a number of spaced points thereon as indicated by the numerals 27, 28, 29, 30 and 31. Suitable fasteners extend through the apertures at points 27–31 for securement thereto of clamps, such as those indicated at 32, 33, 34, 35 and 36. It will be observed that each of the clamps 32–36 overlies a portion of at least one wire strand of the basket 10, the clamps 32–35 clamping wire strands of the wall 11 to outer surfaces of the bracket portions 24, 25, the clamp 36 securing one or more wire strands of the basket bottom wall 15 to the upper surface of bracket portion 26.

The use and operation of the invention are as follows:

The basket assembly of the invention may be easily and conveniently installed on a bicycle, the U-shaped bracket leg portion 21 being secured in a substantially vertical plane to the rigid forks 2, 3 of the bicycle. Since, as appears below, the basket 10 may be positioned at a variety of points on the bracket 20, longitudinally of the bicycle 1, it will be understood that the leg 21 may be moved forwardly or rearwardly along the forks 2, 3 without directly affecting the position of the basket in order to secure the clamps on the inner surfaces of the fork branches 2b, 3b, the design of the forks 2, 3 varying slightly among bicycle models.

With the member 20 thus secured to the bicycle 1 the basket 10 is securely clamped to the outer surface of the portions 24, 25 and 26 of member 20. It will, however, be understood that members 10 and 20 can be first secured together and the resulting assembly attached in the manner above described in relation to member 20 alone, it being necessary only to secure the two clamps 22 to the bicycle rear frame. While the basket 10 is shown to be of a height substantially equal to that of the member 20 and while this provides a convenient arrangement, it will be understood that baskets of a variety of shapes, heights and lengths may be as easily secured to the member 20, it being only necessary that the clamps 32–36 grasp some of the strands of wall 11, the member 26 being clamped by the clamp 36 to the bottom wall of the basket of whatever shape the basket might be. Since a plurality of spaced apertures are provided in the member 20, it will be understood that the number of clamps 32–36 may be varied as desired. Thus the basket 10 would be grasped adjacent its forward portion by clamp 32, at its top intermediate portion by clamp 33, at a rearward portion of wall 11 by clamps 34 and 35, and the bottom wall 15 would be clamped by clamp 36 at a point rearwardly spaced on basket 10 from the clamp 32. Tilting of the basket 10 about elements supporting it only along its center line is thus avoided.

Similarly, it will be observed that the basket 10 may be longitudinally moved with respect to the bicycle 1 and the bracket member 20, the above described clamps being loosened and disengaged from the associated wire strands of the basket 10 and reestablished in clamping engagement with other portions of the strands of basket 10. Thus the forward wall 12 of basket 10 may be suitably positioned to escape any contact with the heel of the bicycle operator as the bicycle pedals are operated.

The structure of the invention provides a strong and rigidly supported basket assembly. The offset or outrigger support 23 is effective to space the basket laterally from the opposed portions of the bicycle 1 to provide for location of various accessories occasionally employed with such bicycle portions. The fender 7 and fender supporting forks 8, which are conventionally of substantially weaker construction than the forks 2, 3 of the bicycle frame, are completely free of any requirement for or contact with the basket assembly of the invention. The fender 7 is thus freed of any tendency toward or need for protection against injury to the finish thereof. Similarly, no elements are associated with the underside of the feeder 7 and the problem of contact by such elements with the tire of wheel 6 is eliminated. If the basket 10 should be heavily loaded, the said load is transferred by the member 20 to the rigid forks 2, 3 and the greatly weaker fender structure 7, 8 is not subjected to the possibility of deformation and bending as a result of such heavy load in the basket 10. The member 20, being formed of relatively thick, wide, flat stock, is fully capable of sustaining all reasonable loads which might be placed in the basket 10 and of transferring the effect of such loads to the rigid forks 2, 3.

The provision of a generally inverted J-shaped support formed by the portions 24, 25 against the outer surface of wire wall 11 provides for attachment of the basket 10 at a number of spaced points on the wall 11; thus a greater rigidity and ability to support greater weights without deformation of the basket 10.

The horizontally disposed bottom wall-supporting shelf or portion 26 is integrally rigid with the leg 25 of member 20 and is thus not subject to becoming loose or to pivotal action.

As earlier set forth, the description of one of the assemblies of the invention suffices for description of the other which is substantially identical thereto. It will be observed, of course, that the members 20 are, because of the offsets 23, formed in left and right hand versions. Should one of the members 20, however, be damaged it can easily be replaced without affecting or requiring the replacement of the other member 20.

Should the bicycle operator wish to operate the bicycle with the baskets absent therefrom, the baskets can be removed from the bracket 20 by mere loosening of the clamps 32–36 and the brackets 20 may be, if desired, allowed to remain in place without interfering in any manner with the operation of the bicycle and without an unsightly appearance resulting therefrom. Should the operator wish to remove the entire structure from the bicycle, it is necessary only that the fasteners 22a be loosened to loosen the clamps 22 from the inner surfaces of fork branches 2b, 3b, for example, and the entire assembly is thus easily removed from the bicycle 1.

When the assembly of the invention is entirely removed from the bicycle, the basket 10 may remain on the member 20 as a unitary whole ready for reinstallation. The bracket 20 being a single unitary member, the problem of lost parts between installations is eliminated. Further, it will be understood that the clamps employed with the member 20 may be merely loosened to free the structure from the bicycle 1 or to free the basket from the member 20, the clamps being retained on the member 20 for later reinstallation of the basket thereon or later reinstallation of the member 20 on the bicycle 1. While the branches of the forks 2, 3 may take a variety of cross-sectional configurations, clamping of the opposed surface of leg 21 against both forks 2 and 3 is easily accomplished and eliminates any concern for matching or mating such cross-sectional configurations.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention. The scope of the invention should, therefore, be limited only by the scope of the hereinafter appended claims.

There is claimed:

1. A saddle basket assembly for bicycles and the like including a support member generally inverted U-shaped in planar configuration, one parallel leg of said support member being offset from the other leg at a point adjacent the curved transverse portion of said support member, said offset leg portion being of sufficient length to bridge the angularly disposed rear forks of a bicycle for attachment thereto, the remainder of said support member being apertured at a plurality of spaced points thereon for reception of clamping members, a basket having an inner wire wall positioned adjacent the outer surface of said support member remainder portion for engagement with said clamping members.

2. A saddle basket assembly for bicycles and the like including a support member generally inverted U-shaped in planar configuration, one parallel leg of said support member being offset from the other leg at a point adjacent the curved transverse portion of said support member, said offset leg portion being of sufficient length to bridge the angularly disposed rear forks of a bicycle for attachment thereto, the remainder of said support member being apertured at a plurality of spaced points thereon for reception of clamping members, a basket having an inner wire wall positioned adjacent the outer surface of said support member reminder portion for engagement with said clamping members, a horizontally, outwardly disposed portion integral with the end of said other leg, said end portion being apertured for reception of a clamping member, said end portion being formed and adapted to extend beneath the bottom wall of said basket.

3. For use in supporting a container on a bicycle having a frame incorporating converging rear frame members, a unitary container-support bracket, said bracket having a first leg formed and adapted to bridge said converging frame members for attachment thereto, an offset portion at one end of said first leg, said offset portion extending angularly upwardly outwardly from said converging frame members, a curved cross section joining the outer end of said offset portion and lying in a plane paralleling that of said frame members, a second leg extending downwardly from said cross portion and paralleling said first leg in the plane of said cross portion, said bracket having a horizontally disposed end portion integral with said second leg and extending outwardly therefrom in a direction away from said frame members, said bracket having a plurality of laterally directed apertures formed therein and spaced thereon at a variety of points from one end to the opposite end of said bracket.

4. A basket support bracket formed of a relatively thick, flat, wide metallic strip, said strip having a generally U-shaped planar configuration and including a first straight leg, an integral, angularly disposed offset portion continuing from the inner end of said first leg, a curved cross portion integrally joining the outer end of said offset portion, a second straight leg joining said cross portion and extending in a plane occupied by said cross portion and paralleling that occupied by said first leg, a horizontally disposed end portion integrally joining the lower end of said second leg and extending outwardly therefrom in a direction away from the plane occupied by said first leg, and a plurality of laterally directed apertures spaced throughout the length of said strip.

5. A basket assembly for bicycles having a frame including converging rear forks, said assembly including a support bracket, said support bracket having a portion secured to and in contact with the outer surface of said converging forks, an offset portion integral with said first-named bracket portion and extending outwardly from said forks, said bracket having an inverted J-shaped portion integrally joining the outer end of said offset portion, and an unwardly open basket having an inner wall secured at a variety of points on said wall to said J-shaped bracket portion.

6. A basket assembly for bicycles having a frame including converging rear forks, said assembly including a support bracket, said support bracket having a portion secured to and in contact with the outer surface of said converging forks, an offset portion integral with said first-named bracket portion and extending outwardly from said forks, said bracket having an inverted J-shaped portion integrally joining the outer end of said offset portion, and an upwardly open basket having an inner wall secured at a variety of points on said wall to said J-shaped bracket portion, said J-shaped portion having a horizontally disposed segment secured to the lowermost end thereof and extending horizontally therefrom away from the plane of said bicycle forks, said basket being secured to said horizontally disposed segment, said basket having at least a forward portion of its inner wall secured to a forward portion of said J-shaped portion, a rearward portion of said bottom wall being secured to said horizontally disposed segment.

7. A basket assembly for bicycles having a frame including converging rear forks, said assembly including a support bracket, said support bracket having a portion secured to and in contact with the outer surface of said converging forks, an offset portion integral with said first-named bracket portion and extending outwardly from said forks, said bracket having an inverted J-shaped portion integrally joining the outer end of said offset portion, and an upwardly open basket having an inner wall secured at a variety of points on said wall to said J-shaped bracket portion, said basket inner wall being secured at its forward and rearward portions to said J-shaped portion, said basket having a bottom wall secured at its rearward portion to a horizontally disposed segment of said J-shaped portion.

References Cited in the file of this patent
UNITED STATES PATENTS

| | | |
|---|---|---|
| 2,776,790 | Zbikowski | Jan. 8, 1957 |
| 2,932,475 | Strogan | Apr. 12, 1960 |
| 2,944,712 | Glenny | July 12, 1960 |